(12) United States Patent
Mei et al.

(10) Patent No.: US 9,696,495 B2
(45) Date of Patent: Jul. 4, 2017

(54) OPTICAL TAP

(71) Applicant: CommScope, Inc. of North Carolina, Hickory, NC (US)

(72) Inventors: Richard Y. Mei, Parker, TX (US); Brian K. Bushnell, Wylie, TX (US); Joseph C. Livingston, McKinney, TX (US); Zuzhou Yue, Plano, TX (US); Chin Choi-Feng, Carrollton, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 0 days.

(21) Appl. No.: 14/749,496

(22) Filed: Jun. 24, 2015

(65) Prior Publication Data

US 2016/0025929 A1 Jan. 28, 2016

Related U.S. Application Data

(60) Provisional application No. 62/017,810, filed on Jun. 26, 2014.

(51) Int. Cl.
*G02B 6/27* (2006.01)
*G02B 6/26* (2006.01)
(Continued)

(52) U.S. Cl.
CPC .......... *G02B 6/2706* (2013.01); *G02B 6/266* (2013.01); *G02B 6/2773* (2013.01); *G02B 6/32* (2013.01); *G02B 6/4286* (2013.01)

(58) Field of Classification Search
CPC ........ G02B 6/2706; G02B 6/266; G02B 6/27; G02B 6/2773; G02B 6/32; G02B 6/4286
(Continued)

(56) References Cited

U.S. PATENT DOCUMENTS 4,753,510 A 6/1988 Sezerman
4,881,789 A * 11/1989 Levinson ............. G02B 6/2852
385/48

(Continued)

*Primary Examiner* — Frank Font
(74) *Attorney, Agent, or Firm* — Muncy, Geissler, Olds & Lowe, P.C.

(57) ABSTRACT

An optical tap includes a support with a first port facing a first ferrule supporting a first fiber along a first axis. A beamsplitter is connected to the support and intersected by the first axis. A second port is fastened to the support and facing a second ferrule supporting a second fiber along a second axis that intersects the beamsplitter. A third port is fastened to the support and facing a third ferrule supporting a third fiber along a third axis that intersects the beamsplitter, wherein the beamsplitter splits a first light signal from the first port to sends first and second portions of the first signal to the second and third ports, respectively. When the beamsplitter may optionally be configured as a polarizing element and include elements configured to rotate relative to each other to change a ratio of the first and second portions. The optical tap may optionally include a light intensity controlling device located in an optical path between the beamsplitter and at least one of the second or third ferrules. Optionally, a first collimating lens is configured to expand a first light beam that is substantially aligned with the first axis, and a second collimating lens is located between the beamsplitter and the second port, and configured to contract the second portion of the expanded first light beam to the second port.

20 Claims, 10 Drawing Sheets

(51) Int. Cl.
  *G02B 6/32* (2006.01)
  *G02B 6/42* (2006.01)
(58) Field of Classification Search
  USPC .......................................... 385/48; 359/230
  See application file for complete search history.

(56) References Cited

U.S. PATENT DOCUMENTS

| | | | | |
|---|---|---|---|---|
| 5,054,877 | A * | 10/1991 | Ortiz, Jr. ............... | G02B 6/2817 385/33 |
| 5,223,975 | A * | 6/1993 | Naganuma ........... | G02B 6/2713 359/484.02 |
| 5,740,288 | A | 4/1998 | Pan | |
| 5,748,369 | A | 5/1998 | Yokota | |
| 6,124,956 | A * | 9/2000 | Severn ................. | G02B 6/2821 385/48 |
| 6,282,025 | B1 * | 8/2001 | Huang ................. | G02B 6/2773 359/489.09 |
| 6,496,623 | B2 * | 12/2002 | Asakura ............. | G02B 6/12007 385/47 |
| 9,329,401 | B2 * | 5/2016 | Sanborn ............... | G02B 27/283 |
| 2001/0007602 | A1 * | 7/2001 | Cao ....................... | G02B 5/3083 385/24 |
| 2001/0026660 | A1 * | 10/2001 | Asakura ............. | G02B 6/12007 385/47 |
| 2003/0090796 | A1 * | 5/2003 | Tai ....................... | G02B 6/2746 359/484.08 |
| 2003/0206349 | A1 * | 11/2003 | Gage .................... | G02B 6/2773 359/489.08 |
| 2003/0206695 | A1 * | 11/2003 | Gerber ................. | G02B 6/2713 385/33 |
| 2004/0086226 | A1 * | 5/2004 | Hellman .............. | G02B 6/2937 385/33 |
| 2004/0223678 | A1 * | 11/2004 | He ........................ | G02B 6/024 385/11 |
| 2004/0264830 | A1 | 12/2004 | Rong | |
| 2005/0018967 | A1 | 1/2005 | Huang et al. | |
| 2005/0068631 | A1 * | 3/2005 | Liu ....................... | G02B 6/272 359/618 |
| 2005/0174639 | A1 * | 8/2005 | Zalevsky ............. | G02B 6/272 359/484.06 |
| 2008/0018861 | A1 | 1/2008 | Schuck et al. | |

* cited by examiner

OPTICAL TAP

This application claims the benefit of U.S. Provisional Application No. 62/017,810, filed Jun. 26, 2014, which is herein incorporated by reference.

BACKGROUND

1. Field of the Disclosure

The present invention generally relates to optical devices, and more specifically, but not exclusively, to an optical tap.

2. Background Details

There is market demand for methods and apparatus that are improved over conventional optical devices that provide an optical tap.

Accordingly, there are long-felt industry needs for methods and an apparatus that improve upon conventional methods and apparatus, including the improved methods and apparatus provided hereby.

SUMMARY OF THE INVENTION

The Applicant has appreciated a need for an improved optical tap. In an example, provided is an optical tap that includes a first port facing to a first ferrule supporting a fiber along an axis, as well as a first collimating lens configured to expand a first light beam that is substantially aligned with the axis. The optical tap includes a beamsplitter configured to receive the expanded first light beam from the first collimating lens, reflect a first portion of the expanded first light beam, and pass a second portion of the expanded first light beam to a second port, where the second port faces to a second ferrule substantially centered about the axis. The optical tap includes a second collimating lens located between the beamsplitter and the second port, and configured to contract the second portion of the expanded first light beam to the second port. The optical tap also includes a first reflective surface optically coupled to the beamsplitter and configured to reflect the first portion of the expanded first light beam to a third port facing to a third ferrule. The optical tap includes a third collimating lens located between the first reflective surface and the third port, and configured to contract the first portion of the expanded first light beam to the third port. The optical tap also includes a second reflective surface optically coupled to the beamsplitter and configured to reflect a portion of an expanded second light beam to a fourth port facing to a fourth ferrule, wherein the expanded second light beam enters the second port and is expanded by the second collimating lens and reflected by the beamsplitter. The optical tap includes a fourth collimating lens located between the second reflective surface and the fourth port, and configured to contract the portion of the expanded second light beam to the fourth port. A portion of the expanded second light beam may also pass through the beamsplitter to the first collimating lens ultimately out the first port.

Optional embodiments employ a light intensity controlling device located in an optical path between the beamsplitter and at least one of the first, second, third and/or fourth ferrules. The light intensity controlling device may be formed as a shutter or a variable optical attenuator.

Optional embodiments employ a polarizing-type beam splitter to enable the signal tap-to-pass ratio to be varied. Rotation of a first element of the polarizing beamsplitter relative to a second element of the polarizing beamsplitter can vary the amount of light permitted to pass through the polarizing beamsplitter, and correspondingly the amount of light reflected by the polarizing beamsplitter as a tap signal.

Further scope of applicability of the present invention will become apparent from the detailed description given herein. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings which are provided by way of illustration only, and thus, are not limits of the present invention.

DETAILED DESCRIPTION

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 1:
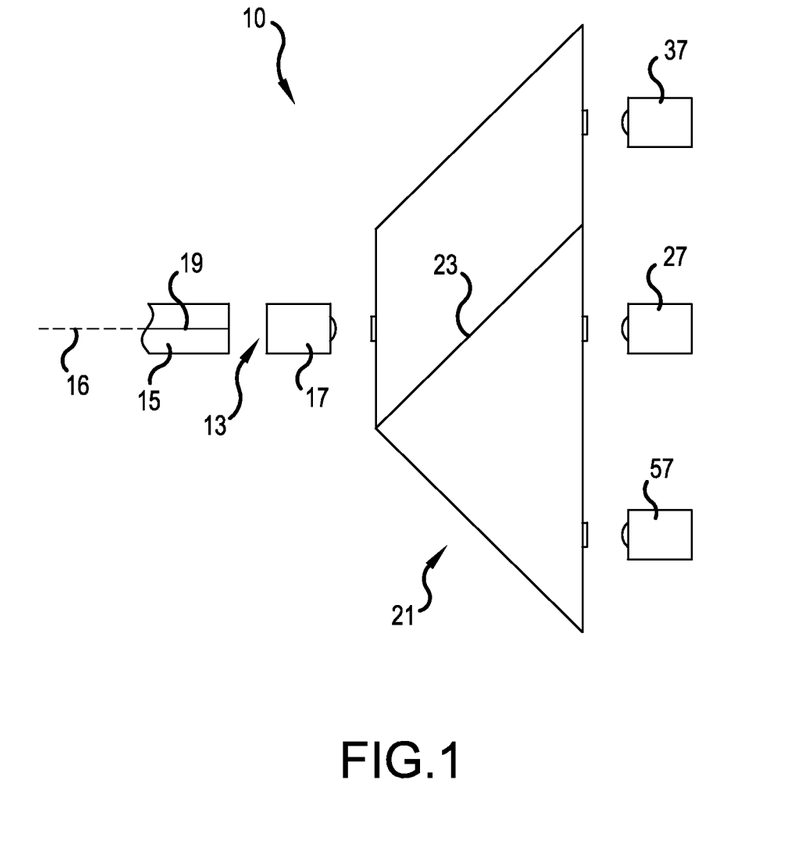
FIG. 1 depicts an optical tap in accordance with the present invention.

FIG. 1 depicts an optical tap 10. The optical tap 10 can be attached to, e.g., within, a support structure 80, as will be described in further detail hereinafter. The optical tap 10 can function as a unidirectional optical tap or as a bidirectional (i.e., full-duplex) optical tap.

The optical tap 10 has a first port 13 facing to a first ferrule 15. The first ferrule 15 supports a first fiber 19 along a first axis 16. The first port 13 can be a face of a first collimating lens 17 fastened to the support structure 80. The first ferrule 15 can also be fastened to, or removably mated with, the support structure 80.

Figure 2:
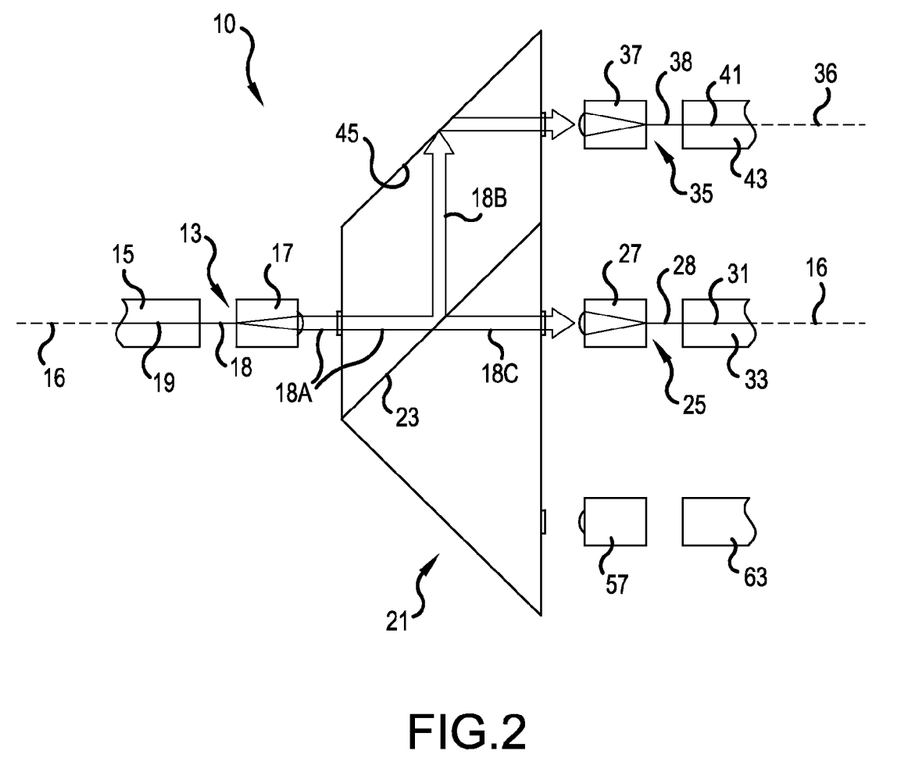
FIG. 2 depicts an exemplary path of a first light beam travelling through the optical tap of FIG. 1.

As depicted in FIG. 2, during operation, a first light beam 18 can be transmitted from the first fiber 19 in a direction substantially aligned along the first axis 16. Specifically, the first light beam 18 is transmitted from the first ferrule 15 into the first port 13, e.g., the surface of the first collimating lens 17. The first collimating lens 17 can be configured to expand the first light beam 18 creating an expanded first light beam 18A that is substantially aligned with the first axis 16.

The optical tap 10 also includes a beamsplitter 21. The beamsplitter 21 can include a thin-film 23. The thin-film 23 can be coated on only one side, or both sides. The coating of the thin-film 23 can include MgF, TiO2, AlO2, and the like. The thin film 23 can be selected to make the beamsplitter 21 polarizing or non-polarizing. Further, the thin film 23 can be selected so that either all, some or none of any number of wavelengths can be split. The beamsplitter 21 can be fastened to the support structure 80. The first axis 16 can be substantially centered on a reflective coating of the thin-film 23 of the beamsplitter 21, and the thin-film 23 can be tilted at an angle relative to the first axis 16, such as at a forty-five degree angle (FIGS. 1-4 and 9) or one hundred thirty-five degrees (FIG. 10).

During operation, the beamsplitter 21 is configured to receive the expanded first light beam 18A from the first collimating lens 17, reflect a first portion 18B of the expanded first light beam 18A, and pass a second portion 18C of the expanded first light beam 18A to a second port 25. The second port 25 can be a face of a second collimating lens 27 fastened to the support structure 80. The second collimating lens 27 can be configured to contract the second portion 18C to a second light beam 28 that is substantially aligned with the first axis 16 and exits the second port 25. The second light beam 28 may be passed to a second fiber 31 held in a second ferrule 33. The second ferrule 33 may be attached to, or removably mated with, the support structure 80

The first portion 18B of the expanded first light beam 18A may be reflected by a first reflective surface 45 to a third port 35. The first reflective surface 45 may be coupled to the beamsplitter 21 with an index-matching adhesive, and/or coupled to the support structure 80. The third port 35 can be a face of a third collimating lens 37 fastened to the support structure 80. The third collimating lens 37 can be configured to contract the first portion 18B of the expanded first light beam 18A to a third light beam 38 that is substantially aligned with a second axis 36 and exits the third port 35. The third light beam 38 may be passed to a third fiber 41 held in a third ferrule 43. The third ferrule 43 may be attached to, or removably mated to, the support structure 80.

The ratio of the first portion 18B of the expanded first light beam 18A to the second portion 18C of the expanded first light beam 18A can be any practically functional amount. Exemplary ratios can be 50/50, 60/40, 40/60, 70/30, 30/70, and the like. In an example, the ratio of the first portion 18B of the expanded first light beam 18A to the second portion 18C of the expanded first light beam 18A can be any amount except infinity and zero.

Figure 3:
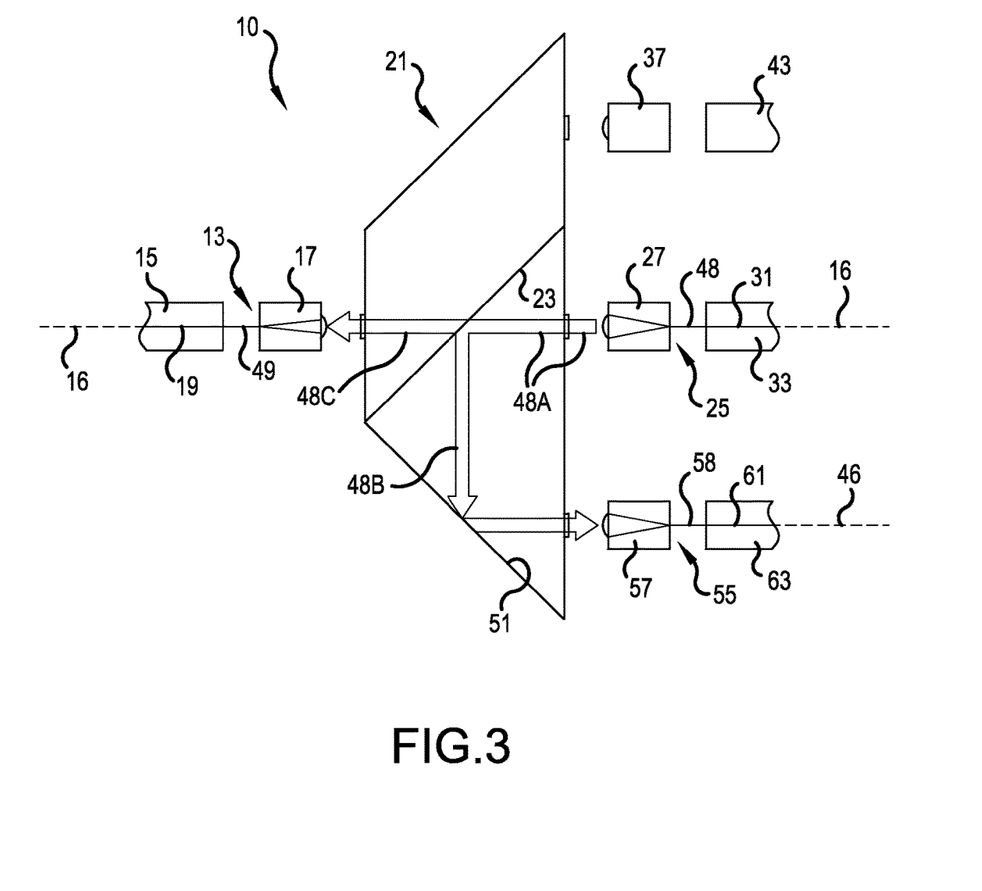
FIG. 3 depicts an exemplary path of a second light beam travelling through the optical tap of FIG. 1.

Now with reference to FIG. 3, a reverse operation of the optical tap 10 will be explained. A fourth light beam 48 can be transmitted via the second fiber 31 substantially aligned along the first axis 16. Specifically, the fourth light beam 48 is transmitted from the second fiber 31 of the second ferrule 33 into the second port 25, e.g., the surface of the second collimating lens 27. The second collimating lens 27 can be configured to expand the fourth light beam 48 creating an expanded fourth light beam 48A that is substantially aligned with the first axis 16.

The beamsplitter 21 is configured to receive the expanded fourth light beam 48A from the second collimating lens 27, reflect a first portion 48B of the expanded fourth light beam 48A, and pass a second portion 48C of the expanded first light beam 48A to the first port 13 of the first collimating lens 17. The first collimating lens 17 can be configured to contract the second portion 48C of the expanded fourth light beam 48A to a fifth light beam 49 that is substantially aligned with the first axis 16. The fifth light beam 49 may be passed to the first fiber 19 held in the first ferrule 15.

The first portion 48B of the expanded fourth light beam 48A may be reflected by a second reflective surface 51 to a fourth port 55. The second reflective surface 51 may be coupled to the beamsplitter 21 with an index-matching adhesive, and/or coupled to the support structure 80. The fourth port 55 can be a face of a fourth collimating lens 57 fastened to the support structure 80. The fourth collimating lens 57 can be configured to contract the first portion 48B of the expanded fourth light beam 48A to a sixth light beam 58 that is substantially aligned with a third axis 46. The sixth light beam 58 may be passed to a fourth fiber 61 held in a fourth ferrule 63. The fourth ferrule 63 may be attached to, or removably mated to, the support structure 80.

The ratio of the first portion 48B of the expanded fourth light beam 48A to the second portion 48C of the expanded fourth light beam 48A can be any practically functional amount. Exemplary ratios can be 50/50, 60/40, 40/60, 70/30, 30/70, and the like. In an example, the ratio of the first portion 48B of the expanded fourth light beam 48A to the second portion 48C of the expanded fourth light beam 48A can be any amount except infinity and zero.

A monitoring device can be coupled to the third and/or fourth ports 35 and 55, depending upon the traffic direction or directions to be monitored. A "tapped off" signal is transmitted from the beamsplitter 21 via the third and/or fourth ports 35 and 55, and can be transmitted to an external piece of equipment, such as network monitoring device, a network tester, and/or a network analyzer. For example, the monitoring device can monitor at least one of fiber-optic signal speed, fiber-optic signal data rate, and fiber-optic signal traffic. Further, the external piece of equipment can be used, in conjunction with the optical tap 10, to monitor network traffic, troubleshoot a network, perform network security tasks, and/or remotely monitor an aspect of a network, such as network speed or performance.

Figure 4:
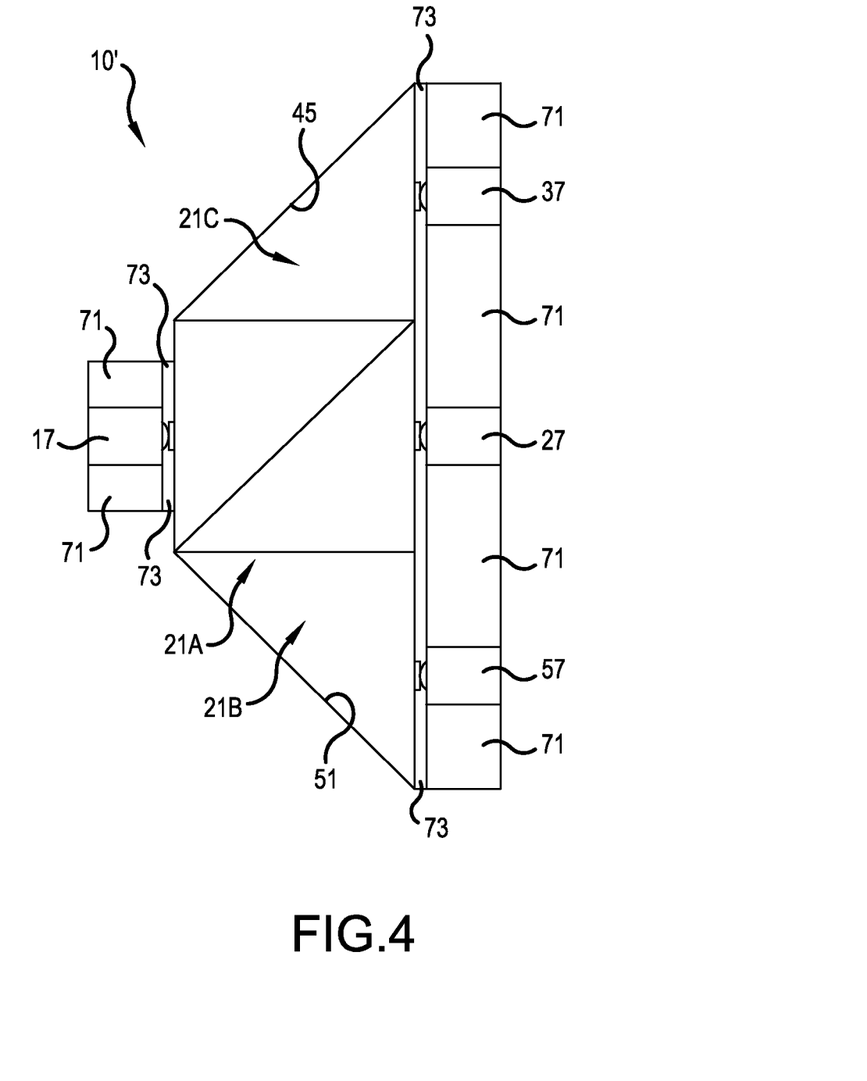
FIG. 4 depicts collimating lenses adhered to a beam splitter of an optical tap.

In one embodiment of an alternative optical tap 10' depicted in FIG. 4, the second, third and fourth collimating lenses 27, 37 and 57 may be attached to each other via a material 71, such as a plastic. In one embodiment, the material 71 may be integrally formed with the second, third and fourth collimating lenses 27, 37 and 57, as one piece of optical plastic or glass. In either instance, the sheet containing the second, third and fourth collimating lenses 27, 37 and 57 may be adhered to the beamsplitter 21 by an adhesive, such as an index-matching epoxy 73. The first collimating lens 17 may also be formed integrally with a material 71 and attached to the smaller, opposite face of the beamsplitter 21 by an index matching epoxy 73. FIG. 4 also illustrates how the beamsplitter 21 may be formed of three pieces, a box-shaped, splitter section 21A adhered to two triangular-shaped, beam redirecting portions 21B and 21C. The three pieces 21A, 21B and 21C may be adhered using the index matching epoxy.

In one embodiment, the first ferrule 15, second ferrule 33, third ferrule 43 and fourth ferrule 63 are MT type ferrules used in conjunction with multi-fiber push-on (MPO) connectors. If MPO connectors are employed, the connectors described herein can conform to specifications IEC-61754-7 "Fibre optic interconnecting devices and passive components—Fibre optic connector interfaces—Part 7: Type MPO connector family" and TIA-604-5-D "Fiber Optic Connector Intermateability Standard, Type MPO."

The optical tap 10 or 10' can tap the first fiber 19 in a first channel of the first ferrule 15 and split a light signal of that first fiber 19 to be transmitted to the second fiber 31 and third fiber 41 in first channels of the second ferrule 33 and third ferrule 43, respectively. Also, the optical tap 10 or 10' can tap the second fiber 31 in a first channel of the second ferrule 33 and split a light signal of that second fiber 31 to be transmitted to first fiber 19 and fourth fiber 61 in first channels of the first ferrule 15 and fourth ferrule 63, respectively.

Figure 8:
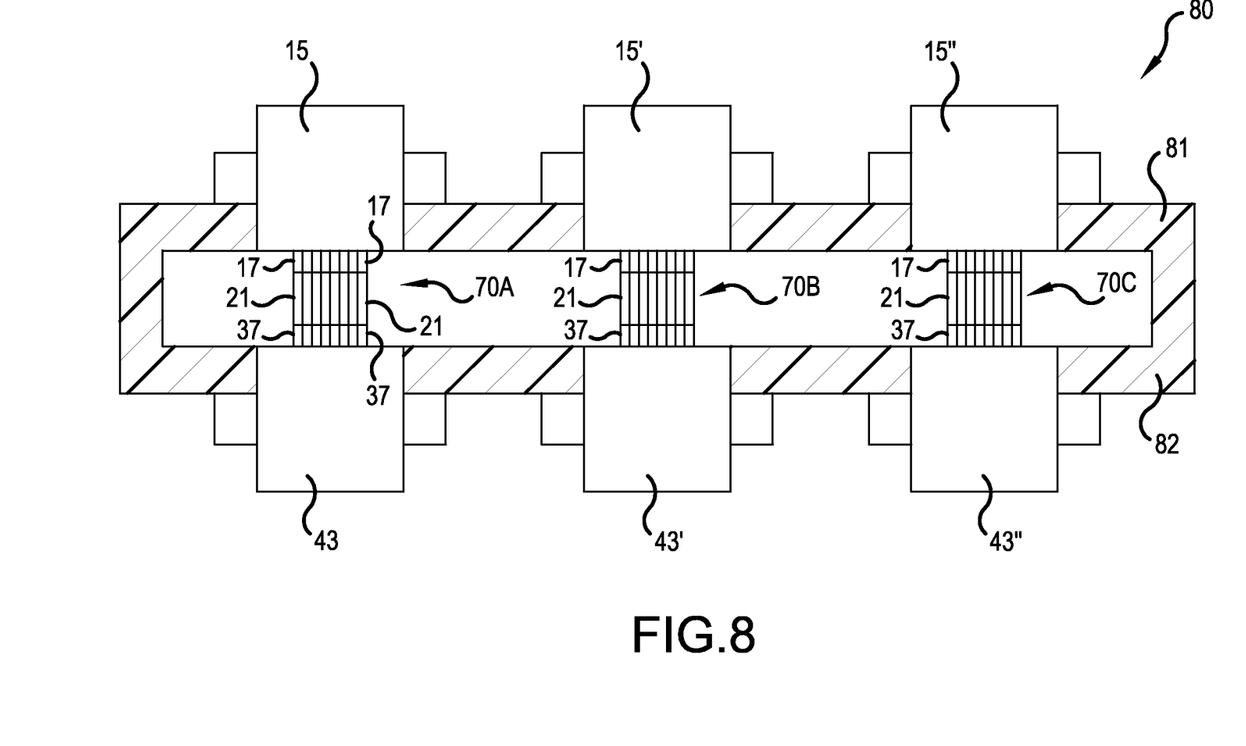
FIG. 8 depicts a cross sectional view taken along line VIII-VIII in FIGS. 6 and 7.

In an embodiment employing MT-type ferrules with eight fiber channels. Eight optical taps 10 or 10' may be stacked, and optionally adhered to each other, to form an array 70A (FIG. 8). The array 70A of eight optical taps 10 or 10' would align to the eight channels of the first, second, third and fourth ferrules 15, 33, 43 and 63.

FIGS. 5-8 illustrate the support structure 80 in the form of a module having a first side 81, an opposite second side 82, a top 83 and a bottom 84. The walls forming the module 80 may all be considered part of the support structure 80, as previously referenced. The first ferrule 15 is located on first side 81 and has eight channels, with each channel aligned to a respective first collimating lens 17 in the array 70A. As best seen in the cross sectional view of FIG. 8, the array 70A of optical taps 10 is located inside and adhered to the support structure 80, e.g., the walls of the module 80. On the opposite, second side 82 of the module 80, the second, third and fourth ferrules 33, 43 and 63 are attached. The second ferrule 33 has eight channels, with each channel aligned to a respective second collimating lens 27 in the array 70A. The third ferrule 43 has eight channels, with each channel aligned to a respective third collimating lens 37 in the array 70A. The fourth ferrule 63 has eight channels, with each channel aligned to a respective fourth collimating lens 57 in the array 70A.

The module 80 may also include a second array 70B of stacked optical taps 10 or 10'. For the second array 70B, another set of first, second, third and fourth MT-type ferrules 15', 33', 43' and 63' may be provided. The module 80 may also include a third array 70C of stacked optical taps 10 or 10'. For the third array 70C, another set of first, second, third and fourth MT-type ferrules 15", 33", 43" and 63" may be provided. Of course, any number of arrays 70 and ferrules may be installed within a module 80. The module 80 may be designed to be rack mounted, or the module 80 may be designed with a bezel to snap into a frame, wherein the frame may receive multiple bezels and may itself be rack mounted.

Although the figures depict MPO connectors with eight fibers, the MPO connectors described herein can each couple to four fibers, twelve fibers, sixteen fibers, or more or fewer fibers. The MPO connectors described herein can also have stacked configurations, e.g., eight fibers in two rows.

Figures 5, 6:
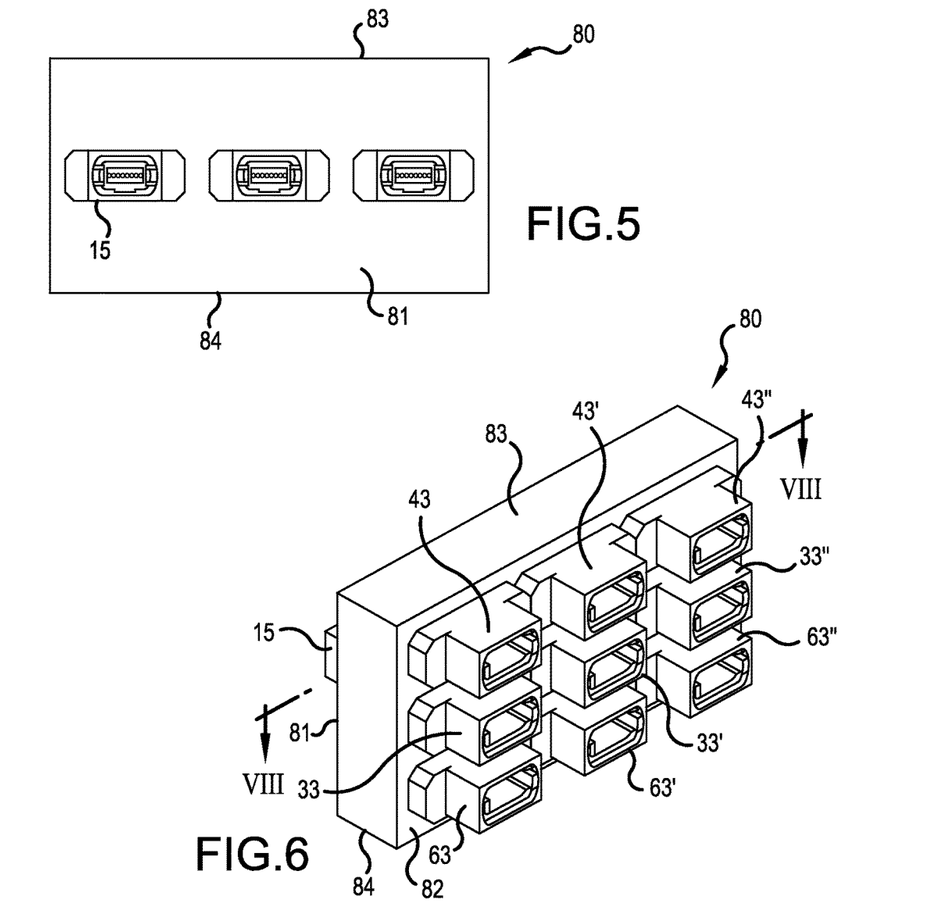
FIG. 5 depicts a front face (left side in FIGS. 1-4) of a housing for a beam splitter.
FIG. 6 depicts a rear, top perspective view of the housing of FIG. 5.
Figure 7:
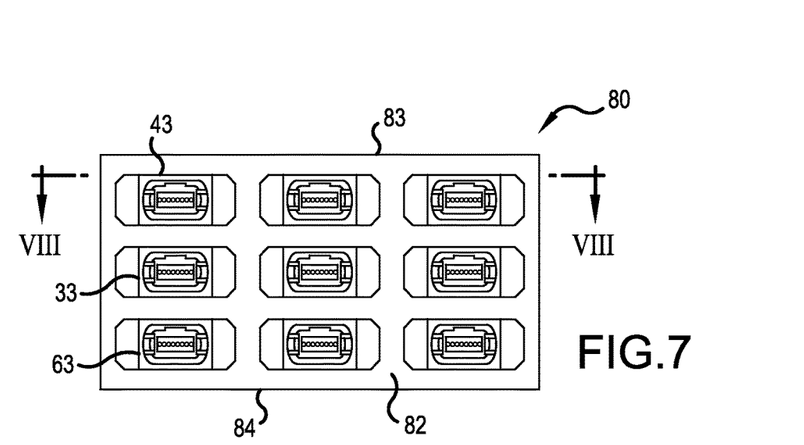
FIG. 7 depicts a rear face (right side in FIGS. 1-4) of the housing of FIG. 5.
Figure 9:
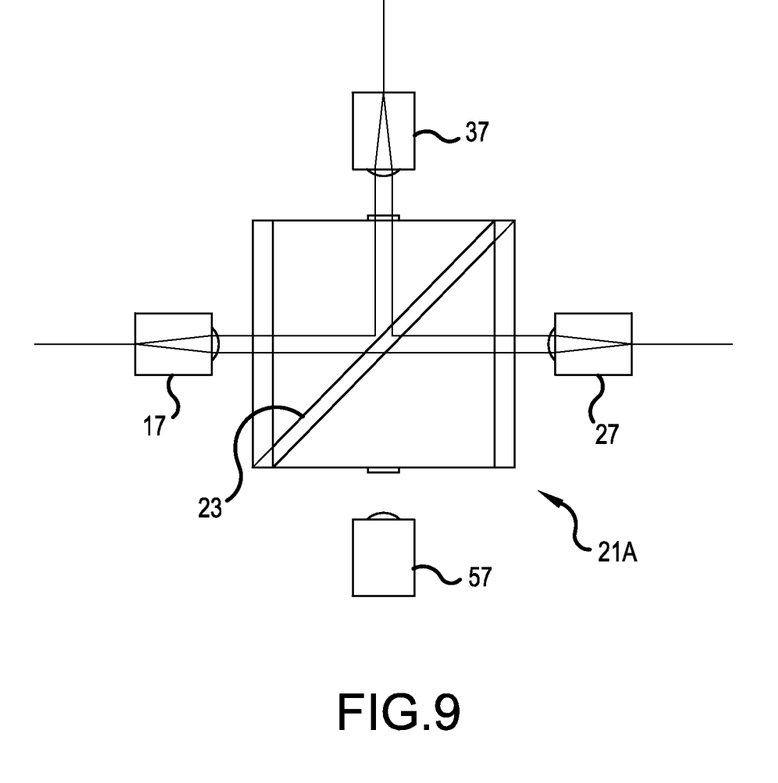
FIG. 9 is a perspective view of a box-shaped beamsplitter in accordance with the present invention.
Figure 10:
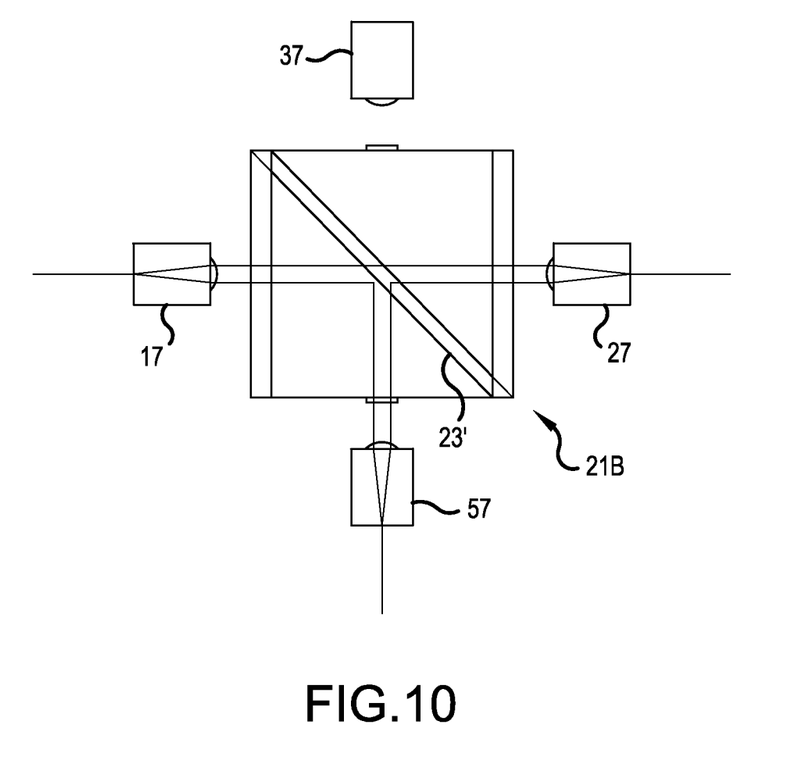
FIG. 10 is a perspective view of a box-shaped beamsplitter similar to FIG. 9, but illustrating a different orientation for a thin-film panel within the beamsplitter.

FIGS. 9 and 10 show a box-shaped beamsplitter 21A and 21B having a thin-film 23 therein. FIGS. 9 and 10 demonstrate that the beamsplitter 21A and 21B does not necessarily need first and second reflective surfaces 45 and 51. For example, the support structure 80 may be designed so that the first, second, third and fourth ports 13, 25, 35 and 55 are located on different sides of the support structure 80. In the embodiment of FIGS. 5-7, this would mean that the first ferrule 15 is mounted on the first side 81, the second ferrule 33 is mounted on the second side 82, the third ferrule 43 is mounted on the top 83 and the fourth ferrule 63 is mounted on the bottom 84.

FIG. 9 demonstrates the light flow paths from the collimating lens 17 to the second and third collimating lenses 27 and 37, respectively, e.g., similar to FIG. 2. FIG. 10 shows a box-shaped beam splitter 21B and demonstrates the light flow paths from the first collimating lens 17 to the second and fourth collimating lenses 27 and 37, respectively. It should be noted that the thin-film 23' in FIG. 10 is angled differently (ninety degrees offset relative to the thin-film 23 in FIG. 9), so that the incoming light signal from the first collimating lens 17 is reflected toward a path leading to the fourth collimating lens 57, rather than to the path leading to the third collimating lens 37 (as shown in FIGS. 1-4 and 9).

Figure 11:
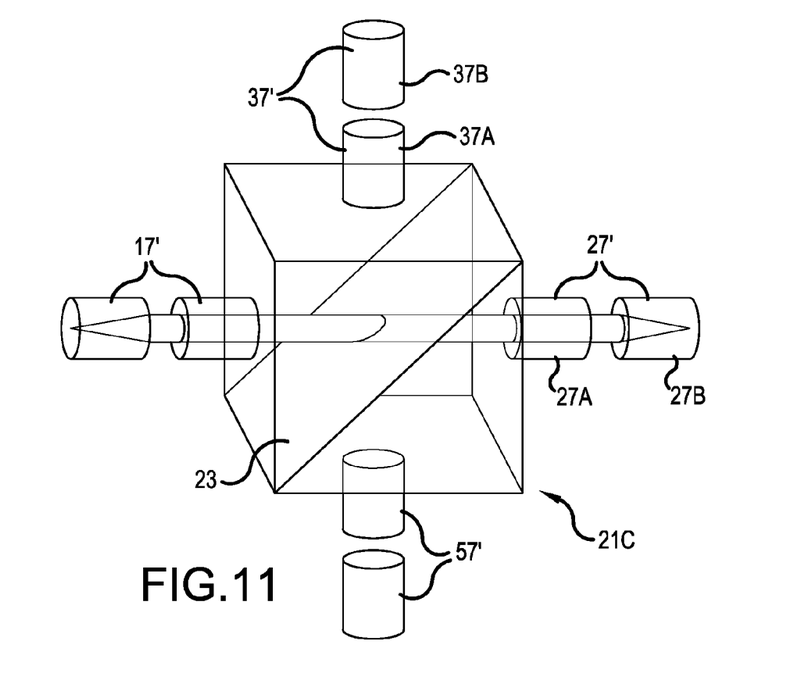
FIG. 11 is a perspective view collimating lens system used in connection with the beamsplitter of FIG. 9.

FIG. 11 shows a box-shaped beamsplitter 21 C having a thin-film 23 therein, e.g., the same as FIG. 9. However, FIG. 11 demonstrates that the single collimating lenses 17, 27, 37 and 57 may be replaced with collimating lens systems 17', 27' 37' and 57', respectively. Each lens system 17', 27' 37' and 57' may include an initial lens, e.g., 27A, and a final lens, e.g., 27B. The lens systems 17', 27' 37' and 57' may be beneficial in more accurately transforming the light signal of a single fiber to/from the expanded beam that passes through the beamsplitter 21 C. The lens system approach may also be beneficial in increasing the optical tap's ability to deal with slight misalignments in component parts, e.g., ferrule-to-port alignments. Also, the lens systems 17', 27' 37' and 57' may accommodate light intensity controlling devices, as will be described next.

Figure 12:
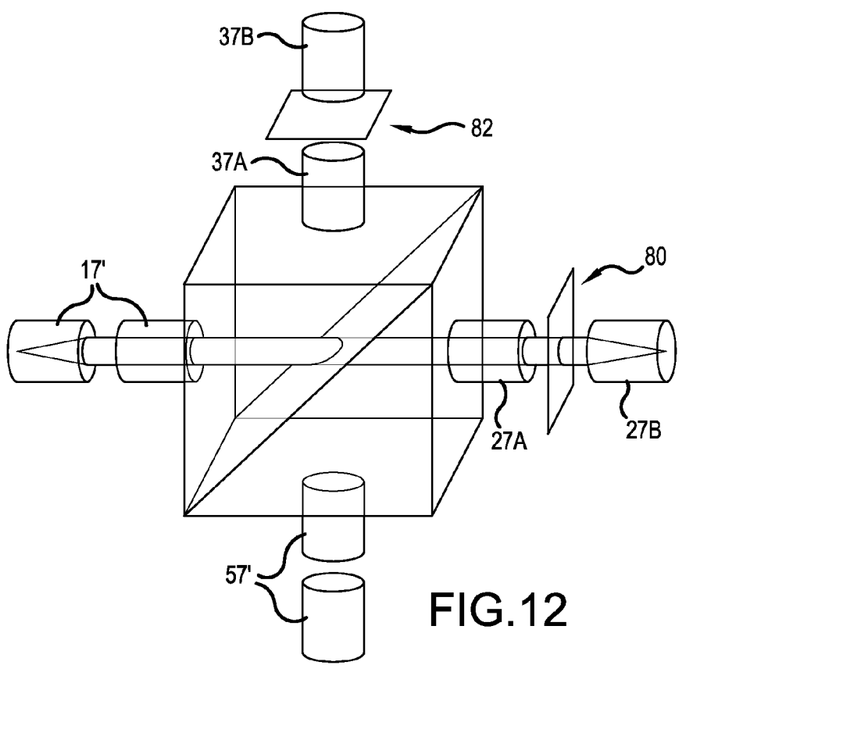
FIG. 12 is a perspective view of the beamsplitter of FIG. 11, but with light intensity controlling devices located in optical paths within the collimating lens systems.

In a supplemental embodiment (FIG. 12), a light intensity controlling device may be located in an optical path between the beamsplitter 21A, B pr C and at least one of the first, second, third and fourth ferrules 15, 33, 43, and/or 63. In FIG. 12, a second light intensity controlling device is a second shutter 80 placed between the initial lens 27A and the final lens 27B of the second collimating lens system 27' for the second ferrule 33. A third light intensity controlling device is a third shutter 82 placed between the initial lens 37A and the final lens 37B of the third collimating lens system 37' for the third ferrule 43. An optional (not illustrated), fourth light intensity controlling device in the form of a fourth shutter may be placed between the initial lens 57A and the final lens 57B of the fourth collimating lens system 57' for the fourth ferrule 63. Also, an optional (not illustrated) first light intensity controlling device in the form of a first shutter may be placed between the initial lens 17A and the final lens 17B of the first collimating lens system 17' for the first ferrule 15. The first shutter would essentially break the communication link.

The shutter 80 or 82 provides the ability to completely stop the light flow path. Therefore, if the beamsplitter 21 were manufactured to send 70% of the first expanded light beam 18A to the second ferrule 33 (via second portion 18C) and 30% of the first expanded light beam 18A to the third ferrule 43 (via first portion 18B), and the shutter in the path to the third ferrule 43 were closed, the fiber 41 in the third ferrule 43 would receive no light signal, while the second fiber 31 in the second ferrule 33 continued to receive 70% of the first expanded light beam 18A. Likewise, if the shutter in the path to the second ferrule 33 were closed, the second fiber 31 in the second ferrule 33 would receive no light signal, while the third fiber 41 in the third ferrule 43 continued to receive 30% of the first expanded light beam 18A.

A shutter 80 or 82 is an all-or-nothing device. When the shutter 80 or 82 is open, essentially all of the light signal is permitted to pass by the shutter 80 or 82. When the shutter is closed, essentially none of the light signal is permitted to pass by the shutter.

However, the shutter 80 or 82 may be replaced by a variable optical attenuator, such as a twisted field effect device (commonly used in LED display devices as a window overlying a light source, wherein the window has polarizing elements that twist in response to electrical control signals to control the intensity of light passing through the window), a polarizer, or some other similar device. A variable optical attenuator is not an all-or-nothing device. Rather, a variable attenuator blocks only a certain percentage of light. For example, a twisted field effect device blocks a percentage of light dependent upon a voltage level applied thereto. Likewise, a polarizer may be formed by placing a first polarizing plate over a second polarizing plate. When the polarizing filter directions of the first and second plates are aligned, the first and second plates permit substantially the entire light signal to pass therethrough. When the polarizing filter directions of the first and second plates are oriented perpendicular, e.g., ninety degrees, relative to each other, the first and second plates permit substantially none of the light signal to pass therethrough. By controlling the relative alignments between the first and second plates, it is possible to create a variable optical attenuator.

Figure 13:
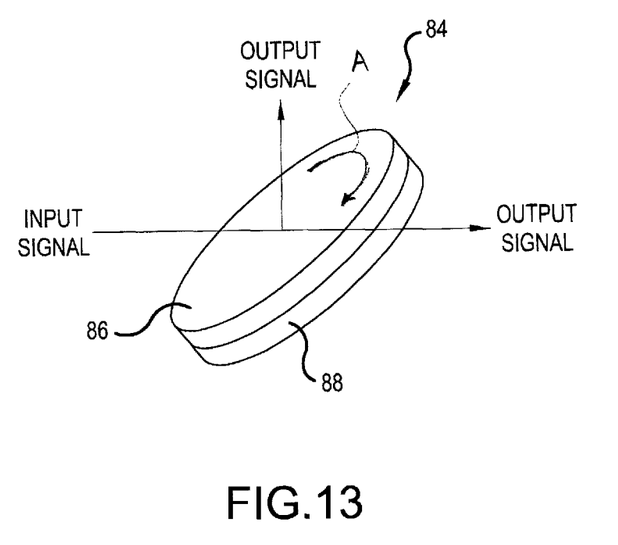
FIG. 13 is a perspective view of a polarizing element, which may replace the thin-film in the beamsplitters of the present invention.

The beamsplitter 21 may also be formed using a polarizing signal splitter. In other words the thin-film 23 in FIGS. 1-4 may be replaced by a polarizing element 84, as depicted in FIG. 13. The polarizing element 84 has a first polarizing plate 86 (upper circular element in FIG. 13) which overlies a second polarizing plate 88 (lower circular element in FIG. 13). The first and second circular elements in FIG. 13 are configured to rotate relative to each other to change a ratio of the first portion 18B of the first signal to the second portion 18C if the first signal. When the polarizing filter directions of the first and second plates 86 and 88 are aligned, the first and second plates 86 and 88 permit substantially the entire light signal to pass therethrough and reflect none of the light signal, e.g., expanded first light beam 18A equals second portion 18C, and first portion 18B equals zero in FIG. 2. When the polarizing filter directions of the first and second plates 86 and 88 are oriented perpendicular, e.g., ninety degrees, relative to each other, the first and second plates 86 and 88 permit substantially none of the light signal to pass therethrough and reflect substantially all of the light signal, e.g., first expanded light beam 18A equals first portion 18B, and third portion 18C equals zero in FIG. 2.

By controlling the relative alignments between the first and second plates 86 and 88, such as by rotating the first plate 86 in the direction of arrow A in FIG. 13 while holding the second plate 88 steady, it is possible to create a variable beamsplitter 21. The ratio of the first portion 18B of the expanded first light beam 18A to the second portion 18C of the expanded first light beam 18A can be any practically functional amount and can be set by the end user, or pre-set by a technician during manufacturing. Exemplary ratios can be 50/50, 60/40, 40/60, 70/30, 30/70, or any other ratio such that the two numbers that comprise the ratio, when added, do not exceed a sum of 100.

The optical taps 10 and 10' described herein are applicable to both single mode and multimode fibers, as well as multi-core fibers of either the single mode type or multimode type.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An optical tap comprising:
a support structure;
a first port fastened to said support structure and facing a first ferrule supporting a first fiber along a first axis;
a polarizing beamsplitter connected to said support structure and intersected by the first axis;
a second port fastened to said support structure and facing a second ferrule supporting a second fiber along a second axis that intersects said polarizing beamsplitter; and
a third port fastened to said support structure and facing a third ferrule supporting a third fiber along a third axis that intersects said polarizing beamsplitter, wherein said polarizing beamsplitter splits a first light signal from said first port, which first light signal represents a communication signal traveling in a first direction through a network, to send first and second portions of the first signal, each of the first and second portions representing the same communication signal traveling in the first direction through the network, to said second and third ports, respectively, and wherein said polarizing beamsplitter includes first and second polarizing plates configured to rotate relative to each other to change a ratio of the first portion of the first signal to the second portion of the first signal.

2. The optical tap of claim 1, wherein the first axis and the second axis are linearly aligned.

3. The optical tap of claim 1, further comprising a monitoring device coupled to one of said second port or said third port via said second ferrule or said third ferrule, respectively, to monitor network signal traffic passing through said third port or said second port, respectively.

4. The optical tap of claim 3, wherein said monitoring device is configured to monitor at least one of fiber-optic signal speed, fiber-optic signal data rate, and fiber-optic signal traffic.

5. The optical tap of claim 1, further comprising a light intensity controlling device located in an optical path between said polarizing beamsplitter and at least one of said second ferrule and said third ferrule.

6. The optical tap of claim 5, wherein said light intensity controlling device is a shutter or a variable optical attenuator.

7. The optical tap of claim 5, wherein said light intensity controlling device is a first light intensity controlling device located in an optical path between said polarizing beamsplitter and said second ferrule, and further comprising:
a second light intensity controlling device located in an optical path between said polarizing beamsplitter and said third ferrule.

8. The optical tap of claim 7, wherein each of said first and second light intensity controlling devices is either a twisted field effect device or a polarizer.

9. The optical tap of claim 1, further comprising:
a fourth port fastened to said support structure and facing a fourth ferrule supporting a fourth fiber along a fourth axis, wherein the third axis and the fourth axis are linearly aligned.

10. An optical tap comprising:
a support structure;
a first port fastened to said support structure and facing a first ferrule supporting a first fiber along a first axis;
a beamsplitter fastened to said support structure and intersected by the first axis;
a second port fastened to said support structure and facing a second ferrule supporting a second fiber along a second axis that intersects said beamsplitter;
a third port fastened to said support structure and facing a third ferrule supporting a third fiber along a third axis, wherein said beamsplitter splits a first light signal from said first port, which first light signal represents a communication signal traveling in a first direction through a network, to send first and second portions each representing the same communication signal traveling in the first direction through the network, to said second and third ports, respectively; and
a light intensity controlling device located in an optical path between said beamsplitter and at least one of said second ferrule and said third ferrule.

11. The optical tap of claim 10, wherein said light intensity controlling device is a first light intensity controlling device located in an optical path between said beamsplitter and said second ferrule, and further comprising:
a second light intensity controlling device located in an optical path between said beamsplitter and said third ferrule.

12. The optical tap of claim 10, wherein said light intensity controlling device is a shutter or a variable optical attenuator.

13. The optical tap of claim 10, further comprising:
a fourth port fastened to said support structure and facing a fourth ferrule supporting a fourth fiber along a fourth axis that intersects said beamsplitter.

14. The optical tap of claim 13, wherein the fourth axis intersects said beamsplitter after being reflected by a reflective surface toward said beamsplitter.

15. An optical tap, comprising:
a first port facing a first ferrule supporting a fiber along a first axis;
a first collimating lens configured to expand a first light beam that is substantially linearly aligned with the first axis, said first beam of light containing signals traveling in a first direction in a network;
a beamsplitter configured to receive the expanded first light beam from said first collimating lens, reflect a first portion of the expanded first light beam representing the signals traveling in the first direction in the network, and pass a second portion of the expanded first light beam representing the same signals traveling in the first direction in the network to a second port, wherein the second port faces a second ferrule; and
a second collimating lens located between said beamsplitter and said second port, and configured to contract the second portion of the expanded first light beam to said second port, wherein the same signals traveling in the first direction through said second port may be monitored using the first portion of the expanded first light beam.

16. The optical tap of claim 15, further comprising:
a first reflective surface optically coupled to said beamsplitter and configured to reflect the first portion of the expanded first light beam to a third port facing a third ferrule;
a third collimating lens located between said first reflective surface and said third port, and configured to contract the first portion of the expanded first light beam to said third port, wherein the same signals traveling in the first direction through said second port may be monitored at said third port.

17. The optical tap of claim 16, wherein said first reflective surface is fastened to said beamsplitter with an index-matching adhesive.

18. The optical tap of claim 16, wherein at least one of said first ferrule, said second ferrule or said third ferrule is an MT ferrule.

19. The optical tap of claim 16, further comprising:
   a second reflective surface optically coupled to said beamsplitter and configured to reflect a portion of an expanded second light beam to a fourth port having a fourth ferrule, wherein the expanded second light beam is expanded by said second collimating lens and reflected by said beamsplitter; and
   a fourth collimating lens located between said second reflective surface and said fourth port, and configured to contract the portion of the expanded second light beam to said fourth port, wherein the expanded second light beam represents signals traveling in a second direction in the network.

20. The optical tap of claim 19, wherein at least one of said first collimating lens, said second collimating lens, said third collimating lens, or said fourth collimating lens are fastened to said beam splitter by an index matching epoxy.

* * * * *